United States Patent [19]

Korshak et al.

[11] 4,036,818
[45] July 19, 1977

[54] METHOD OF PREPARING POLYMERS OF POLYPHENYLENE TYPE

[76] Inventors: Vasily Vladimirovich Korshak, ulitsa Gubkina, 4, kv. 81; Vladimir Alexandrovich Sergeev, Profsojuznaya ulitsa, 34, korpus 4, kv. 26; Mikhail Mikhailovich Teplyakov, ulitsa Gastello, 37, kv. 3, all of Moscow, U.S.S.R.

[21] Appl. No.: 643,112
[22] Filed: Dec. 22, 1975

Related U.S. Application Data

[63] Continuation of Ser. No. 414,773, Nov. 12, 1973, abandoned, which is a continuation of Ser. No. 114,353, Feb. 10, 1971, abandoned.

[30] Foreign Application Priority Data

Mar. 16, 1970  U.S.S.R. .............................. 1409968

[51] Int. Cl.$^2$ .............................................. C08G 6/00
[52] U.S. Cl. ................................... 260/63 K; 260/50
[58] Field of Search ....................... 260/63 R, 63 K, 50

[56]  References Cited
U.S. PATENT DOCUMENTS

| 2,307,891 | 1/1943 | Liber ...................................... 260/592 |
| 2,315,063 | 3/1943 | Liber ...................................... 252/52 |
| 3,280,075 | 10/1966 | Naarmann et al. ..................... 260/63 |

*Primary Examiner*—Lester L. Lee

[57]  ABSTRACT

Polymers of the polyphenylene type comforming to the general formulas

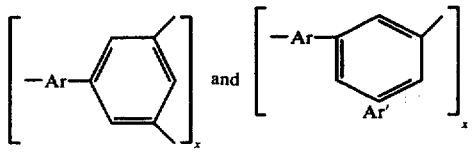

where X is any number;

Ar is 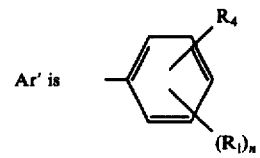

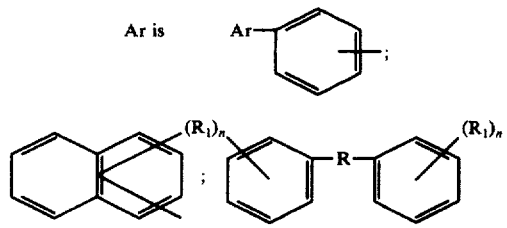

where $n = 1-4$ and R is a simple bond; $(CH_2)_m$ with $m = 1-20$; CH=CH; C≡C; $CR_1R_2$;

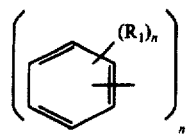

with $p = 1-10$, $R_1$ and $R_2$ standing for H, lower alkyls or phenyl; O; S; CO;

Ar' is 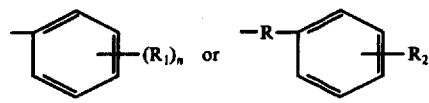

where $R_4$ is H, Cl, Br, phenyl,

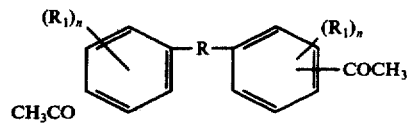

with $n$, R, $R_1$ and $R_2$ as defined above.

A method for producing said polymers of the polyphenylene type, which comprises polycyclocondensaton of diacetylbenzenes, diacetylnaphthalenes, diacetyl compounds of the general formula with $n$, R and $R_1$ as defined above, triacetylbenzenes, 1,3,5-tri(acetylphenyl)benzenes or tri- or tetraacetyloligophenyls, or comprises copolycyclocondensation of the above-said acetyl-substituted aromatic compounds with methylarylketones of the general formula

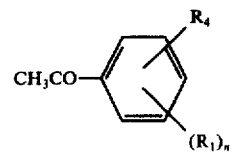

where $R_4$ is H, Cl, Br, phenyl,

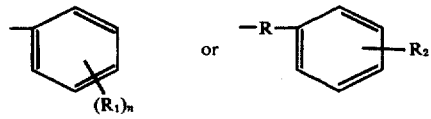

with $n$, R, $R_1$ and $R_2$ as defined above, or with monoacetylnaphthalenes in the presence of acid catalysts in a solution, melt or solid phase.

The herein-proposed polymers of polyphenylene type feature high thermostability and heat-resistance, are chemically stable and have a number of other valuable properties.

18 Claims, No Drawings

METHOD OF PREPARING POLYMERS OF POLYPHENYLENE TYPE

This is a continuation of application Ser. No. 414,773 filed Nov. 12, 1973 which in turn is a Continuation of Ser. No. 114,353 filed Feb. 10, 1971, both of which are now abandoned.

The present invention relates to polymers of the polyphenylene type and to a method for producing thereof.

Polymers of the polyphenylene type feature high thermostability and heat-resistance, they are chemically stable and have a number of other valuable properties. Depending on the character and structure of the polymeric chain, polyphenylenes are capable of withstanding temperatures ranging from 300°–400° to 900° C. Various articles based on polyphenylenes can operate over a long period of time under temperature conditions of 300° to 500° C. Thus, polyphenylenes can be successfully used for the development of special fields of modern engineering By now polyphenylenes have been produced and various methods for their production elaborated, among which most widely known are oxidation dehydropolycondensation of benzene and its derivatives, condensation of benzene dihalides by following the Wurtz-Fittig or Ullmann reaction, decomposition of bis-diazonium salts, dehydration of polycyclohexadiene-1,3,polycondensation of bis-tetraphenylcyclopentadienes with diethynyl compounds.

Said methods prove to be quite complicated with regard to the synthesis of the starting monomers of polymers themselves, or, else, they are characterized by the fact that the resulting polymer products are infusible and insoluble, so that they are difficult to process into articles.

The object of the present invention is to eliminate the above-mentioned disadvantages.

It is a specific object of the invention to provide for the production of fusible or softening linear or branched polymers of the polyphenylene type that are soluble in organic solvents, as well as to provide for the production of infusible, non-softening and insoluble polyphenylenes that would feature high thermostability.

According to the invention, said object is accomplished by that new polymers of the polyphenylene type are proposed, having the structures

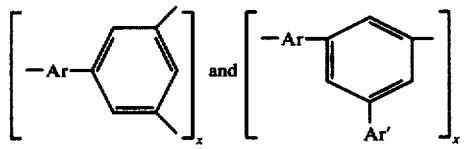

where X is any number;

Ar is

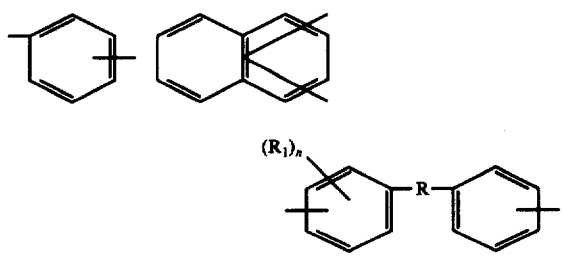

where $n = 1-4$ and R is a simple bond; $(CH_2)_m$ with $m = 1-20$; $CH=CH$; $C\equiv C$; $CR_1R_2$,

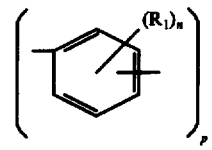

with $p = 1-10$, $R_1$ and $R_2$ stand for H, lower alkyls or phenyl; O; S; CO;

Ar' is

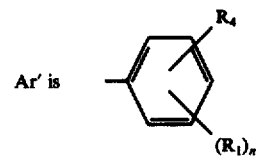

where $R_4$ is H, Cl, Br, phenyl,

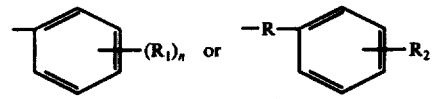

with $n$, R, $R_1$ and $R_3$ as defined hereinabove.

Polymers of the above-said structure are produced by a method which, according to the invention, is based on the polycyclocondensation of diacetylnaphthalenes, diacetylbenzenes, diacetyl compounds of the general formula

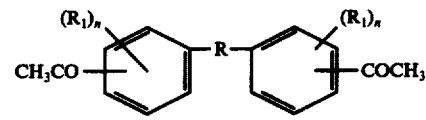

where $n = 1-4$ and R is a simple bond; $(CH_2)_m$ with $m = 1-20$; $CH=CH$; $C\equiv C$; $CR_1R_2$;

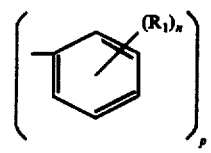

with $p = 1-10$, $R_1$ and $R_2$ stand for H, lower alkyls or phenyl; O; S; CO, triacetylbenzenes, 1,3,5-tri(acetylphenyl)benzenes or tri- and tetraacetyloligophenyls, or on the reaction of copolycyclocondensation of the above-said acetyl-substituted aromatic compounds with methylarylketones of the general formula

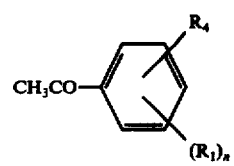

where $R_4$ is H, Cl, Br, phenyl

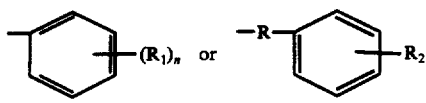

with n, R, R₁ and R₂ as defined hereinabove, or with monoacetylnaphthalenes in the presence of acid catalysts in a solution, melt or solid phase.

The synthesis of polyphenylenes, starting from polyacetyl aromatic compounds or their mixtures with monoacetyl aromatic compounds is based on the ability of acetyl groups to condense in the presence of an acid catalyst, with the formation of a 1,3,5-substituted benzene ring according to the diagram

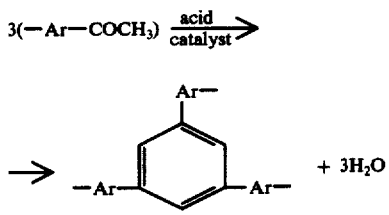

The process of copolycyclocondensation of diacetyl and monoacetyl compounds results in the formation of polyphenylenes featuring a less branched configuration, noted for a greater mobility of the melt and a better solubility in organic solvents.

As a solvent it is recommended to use organic solvents selected from the class of aromatic hydrocarbons, chlorinated hydrocarbons, amines, alcohols, glycols, ethers, phenols or aprotic polar solvents. As a solvent use may also be made of polyphosphoric acid, which at the same time is an acid catalyst.

To accelerate the reaction and reduce the process temperature when it is carried out in a solution, the synthesis of polymers is effected in the presence of a ketalyzing agent. Preferred ketalyzing agents are triethyl orthoformate, dimethylsulphite and triethyl orthosilicate.

For obtaining products featuring high heat- and thermostability, the synthesized polymers are brought over to infusible and insoluble state by virtue of further condensation of terminal acetyl groups of the polymers, either by heating them at 200°–300° C, or by heating in the presence of acid catalysts at 150°–300° C.

For producing soluble and fusible polymers with terminal phenyl or aryl groups, the obtained polyphenylenes are treated under the conditions of synthesis with a monoarylketone of the general formula

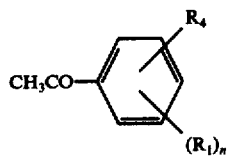

with the values of R₁, R₄ and n as specified hereinabove, the last-mentioned compound being taken in excess of the terminal acetyl groups present in the polyphenylene.

The herein-proposed polymers of the polyphenylene type are produced in the following manner.

The above-mentioned diacetyl aromatic compounds are subjected to polycyclocondensation or to copolycyclocondensation with the above-said monoacetyl aromatic compounds in the presence of acid catalysts in a melt, in the medium of a solvent or in solid phase. The process likewise can be carried out first under the conditions of, say, a solution, and then under those of a solid phase.

As acid catalysts use is made of hydrogen chloride or hydrogen bromide; mineral acids such as $H_2SO_4$, $H_3PO_4$, polyphosphoric acid; mixtures of mineral acids with mineral acid salts such as a mixture of $H_2SO_4$ with potassium or sodium pyrosulphite or a mixture of $H_2SO_4$ with $AlCl_3$; acid salts of mineral acids such as $Zn(HSO_4)_2$; strong organic acids such as p-toluene sulphonic acid or other organic sulphonic acids; trifluoroacetic acid; compounds of Lewis acids type, such as $AlCl_3$, $AlBr_3$, $ZnCl_2$, $BF_3$, $SnCl_4$; oxides such as PbO, $TiO_2$, $Al_2O_3$; organoelemental compounds such as tetrabutoxytitanium; hydrides of metals such as $CaH_2$; acyl halides of inorganic or organic acids such as acetyl chloride, thionyl chloride or sulphuryl chloride; complexes of amines or amines with HCl or $SO_3$ such as aniline hydrochloride, pyridine hydrochloride or a complex of $SO_3$ with dimethylformamide. As a catalyst use may be made of mixtures of said compounds.

Depending on the procedure employed for carrying out the process, the reaction temperature can be different, ranging from −30°, −40° C and lower to 200°–300° C; the reaction may be run first at a lower, and then at a higher temperature. When the reaction temperature is of the order of 100° C and over, it is desirable that the process should be carried out in the presence of air oxygen, that is, in the atmmosphere of an inert gas or under a vacuum.

In case the process is carried out in a solution, as solvents use may be made of aromatic hydrocarbons, preferably benzene and its homologues; chlorinated hydrocarbons such as methylene chloride ($CH_2Cl_2$), chloroform ($CHCl_3$), dichloroethane, chlorobenzene, o-chlorobenzene; amines such as aniline, pyridine, quinoline; aliphatic or aromatic alcogols, glycols, ethers or phenols such as dioxane, ethylcellosolve, anisole, cresol, benzyl alcohol; polar aprotic solvents such as dimethylsulphoxide.

Polyphosphoric acid, aleum or chlorosulphonic acid can be used as a solvent which at the same time functions as a catalyst and a dehydrating agent.

As pointed out hereinabove, in case the process is carried out in a solution, for accelerating the reaction and increasing the yield of polymer, ketalyzing agents should be used together with a catalyst. As ketalyzing agents use preferably should be made of triethyl orthoformate, dimethylsulphite or triethyl orthosilicate.

The duration of the polycyclocondensation and copolycyclocondensation process may be from several minutes to several hours. Depending on how long the process lasts, it is possible to produce either polymers that are soluble in organic solvents, fusible or softening, featuring a linear or branched configuration, or insoluble, infusible and non-softening three-dimensional polyphenylenes.

The reaction of polycyclocondensation or copolycyclocondensation of acetyl monomers should be preferably carried out in a solvent, with the process duration being selected to yeild linear or branched fusible and soluble polyphenylenes with acetyl terminal groups. The resulting polymers are precipitated from the solution, if necessary, washed from the catalyst, reprecipitated or fractionated and dried in a vacuum drier at a temperature not below 100° C. An important feature of the polymers thus produced is their thermoactivity, that is, their ability to become infusible and insoluble when heated. For producing infusible and insoluble polymers, the synthesized polyphenylenes are subjected to thermal transformations at a temperature of 150°-300° C in the presence of the above-specified acid catalysts. The resulting infusible and insoluble products do not change their thermal deformation characteristics up to temperatures of their thermal decomposition, that is, up to those above 400° C.

The soluble and fusible polyphenylenes with acetyl terminal groups can be treated under the experimental conditions with a monoarylketone of the general formula

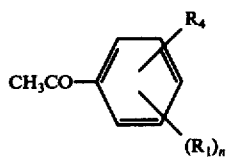

with $R_1$, $R_4$ and $n$ as defined above, which is to be taken in excess of the terminal acetyl groups present in the polyphenylene. In this case the resulting products are soluble and fusible polyphenylene with phenyl or aryl terminal groups, featuring high thermostability and applicable as, say, high-temperature heat carriers or as a liquid phase for high-temperature chromatography.

The herein-proposed novel method for producing polymers of the polyphenylene type is based on the use of easily available aromatic compounds, is technologically simple, requires conventional chemical equipment for its realization and makes it possible to produce polymers of the polyphenylene type of various structures.

For a better understanding of the present invention, given hereinbelow are examples illustrating the way in which the proposed method can be embodied, as well as the characteristics of the desired products obtained in compliance therewith. The formation of the polymers of the polyphenylene type has been confirmed by the data obtained through the use of IR-spectroscopy, elementary analysis, thermogravimetric analysis and other methods, as well as by the results of the synthesis and investigation of the corresponding model compounds.

EXAMPLE 1

A flask equipped with a stirrer is charged with 10 g of 4,4'-diacetylphenyl, 150 ml of absolute 1,2-dichloroethane and 20 ml of freshly distilled triethyl orthoformate, whereupon a stream of dry HCl is passed therethrough under intense stirring and at room temperature. A brown-coloured solution is formed, from which a precipitate falls out after a certain period of time. The stirring is continued still further, then the precipitated matter is decanted, washed with ethyl alcohol and water till the reaction becomes neutral and then extracted in a Soxhlet apparatus with ethyl alcohol during 24 hours. The polymer is dried in a vacuum drier at 60° C and then heated at 250° C under a vacuum (1-1.5 mm Hg) for 6 hours. The resulting product is a yellow powder, insoluble in conventional organic solvents. The yield of the polymer is 9.6 g. Found, %: C = 89.1; H = 5.1. IR-spectra show the presence of a 1,3,5-substituted benzene nucleus, a $CH_3$-group and a carbonyl group in the polymer. The polymer does not soften when heated up to 700° C (as determined thermomechanically) and loses in weight as little as 25% when heated in an inert atmosphere up to 900° C (according to the thermogravimetric data).

EXAMPLE 2

In a flask equipped with a stirrer 2 g of p-diacetylbenzene in 30 ml of absolute benzene are dissolved under stirring and then 1.15 ml of acetophenone and 6 ml of triethyl orthoformate are added thereto. The molar ratio of diacetyl to monoacetyl is 1:0.8. A stream of HCl is passed through the solution for 15 minutes at room temperature and under intense stirring. The result is a brown-coloured solution. This solution is filtered and precipitated into ethyl alcohol. The resulting polymer is isolated, washed with water, extracted with ethyl alcohol in a Soxhlet apparatus during 24 hours and then dried in a vacuum drier at 60°-80° C. The yield of polyphenylene is 1.35 g. The product is a yellow powder, soluble in benzene, chloroform, chlorobenzene, dimethylsulphoxide and in a number of other organic solvents. The average molecular weight of the polyphenylene, as determined ebullioscopically in chloroform, is 3500. Found, %: C = 88.72; H = 5.77. Flow temperature according to thermomechanical data is 190°-220° C. The IR-spectra of the polymer show the presence of 1,3,5-substituted benzene nuclei (absorption bands within 875 $cm^{-1}$). The polymer is a thermoreactive product and, when heated, it becomes an infusible and insoluble thermostable and heat-resistant polymer.

EXAMPLE 3

The polymer synthesized as described in Example 2 is heated in a tube under high vacuum conditions (about $1.10^{-3}$ mm Hg) first at 250° C during 1 hour and then at 300° C during 3 hours. The resulting polymer starts losing in weight, according to thermogravimetric data, when heated in air at a temperature above 400° C, and when heated in an inert atmosphere to 900° C losses in weight amount to 24%. Found, %: C = 88.59; H = 4.55.

EXAMPLE 4

3 g of p-diacetylbenzene are dissolved in 45 ml of absolute benzene in a flask under stirring and 11.5 ml of triethyl orthoformate and 2.17 ml of acetophenone are added thereto. The molar ratio of diacetyl to monoacetyl is 1:1. The reaction in the presence of HCl and the isolation of the polymer are carried out by following the procedure described in Example 2. The resulting product is a polyphenylene whose properties are close to those of the corresponding product of Example 2. Found, %: C = 89.80; H = 5.40.

EXAMPLE 5

The polymer synthesized as described in Example 4 is heated in a tube under high vacuum conditions (about $1.10^{-3}$ mm Hg) during 1 hour at 250° C and then during 3 hours at 300° C in the presence of 20 wt. % of $ZnCl_2$; then the catalyst is removed from the polymer by extraction with hydrochloric acid. According to the thermogravimetric data the polymer presences 50% of its weight in air at a temperature of up to 740° C.

EXAMPLE 6

4 g of 4,4'-diacetyldiphenylsulphoxide, 1 g of potassium pyrosulphite ($K_2S_2O_7$) and 0.2 ml of concentrated 98% $H_2SO_4$ are heated in a condensing tube at 180° C during 3 hours in argon atmosphere. The resulting polymer is comminuted, washed repeatedly with hot water, then kept in boiling water during 3 hours and then extracted with ethyl alcohol in a Soxhlet apparatus during 48 hours. The polymer is dried at 100° C in a vacuum drier. The yield is 2.83 g. The polymer is a brown-coloured product, insoluble in conventional organic solvents. According to the thermogravimetric analysis data, the polymer starts decomposing when heated in air above 350° C and at 600° C losses 50% of its initial weight. Under heating to 900° C in an inert atmosphere the loss in weight in 39%.

EXAMPLE 7

3 g of 4,4'-diacetyldiphenyloxide are dissolved in a flask under stirring in 100 g of polyphosphoric acid at 100° C, then 1.1 ml of acetophenone are added thereto (the molar ratio of diacetylphenyloxide to acetophenone being 1:0.8) and the mixture is heated at 120° C during 4 hours. The reaction solution is poured into ethyl alcohol under cooling. The resulting precipitate is washed with hot water and allowed to stay overnight in a sodium hydroxide solution. Then the product is washed with water, extracted with ethyl alcohol in a Soxhlet apparatus and dried in a vacuum drier at 100° C. The yield is 2.22 g. Melting point is 300° C. The product is a brown-coloured powder, soluble in benzene and chloroform. It is heated in the presence of 0.2 g of lead oxide under a vacuum (1.2-2 mm Hg) for 2 hours at 200° C and then for 2 hours at 300° C. The resulting polymer is insoluble in benzene and dichloroethane and losses 20% of its weight when heated in air up to 500° C and 37% thereof when heated in an inert atmosphere up to 900° C.

EXAMPLE 8

In a flask equipped with a stirrer 2 g of 4,4'-diacetyldiphenyloxide are dissolved in 45 ml of absolute benzene and then 1.1 ml of acetophenone and 5 ml of triethyl orthoformiate are added thereto. The molar ratio of diacetyl to monoacetyl is 1:1.2. A stream of dry HCl is passed through the solution during 1 hour at room temperature and under intense stirring. The polymer is isolated as described in Example 2. The yield is 1.28 g. The polymer is a yellow powder, soluble in chloroform, benzene, dimethylsulphoxide, dioxane and in some other organic solvents. The average molecular weight of the polymer is 4200. Found, %: C = 85.97; H = 4.60. The IR-spectra of the polymer show the presence of an absorption, band in the region of 875 cm−1 which is characteristic of 1,3,5-substituted benzene nuclei.

EXAMPLE 9

In a flask equipped with a stirrer 8 g of 4,4'-diacetylphenyloxide are dissolved in 120 ml of absolute benzene under stirring, whereupon 19 ml of triethyl orthoformate and 2.94 ml of acetophenone are added thereto. The molar ratio of diacetyl to monoacetyl is 1:1. A stream of dry HCl is passed during 20 minutes at room temperature and under intense stirring. The polymer is isolated as described in Example 2.

The polymer properties are similar to those of the polymer descrined in Example 8. The yield is 7.37 g. Found, %: C = 89.20; H = 5.17. The average molecular weight of the polymer is 2700. The polymer is readily soluble in chloroform, benzene and in some other organic solvents.

The polymer is heated at 300° C for 1 hour in the presence of 10 wt. % of p-toluenesulphonic acid. The resulting polymer is completely insoluble in boiling chloroform and, according to the thermomechanical data, it is not liable to deformation when heated up to 500° C.

EXAMPLE 10

2 g of p-diacetylbenzene are dissolved in a flask in 30 ml of absolute benzene and then 6 ml of triethyl orthoformate are added thereto. A stream of HCl is passed through the solution for 15 minutes under intense stirring. The product is precipitated with ethyl alcohol, washed with water, extracted with ethyl alcohol in a Soxhlet apparatus and then dried in a vacuum drier at 80° C. The resulting polyphenylene is a yellow powder which is soluble in benzene, toluene, chloroform and in a number of other organic solvents. The average molecular weight of the polyphenylene, as determined ebullioscopically in chloroform, is 1600, its softening point is 200° C. Then the polymer is converted into an infusible and insoluble product by heating it in a tube at 300° C in an inert atmosphere. The product thus produced, according to the thermomechanically data, starts softening within the temperature range of 450° to 500° C.

EXAMPLE 11

5.6 g of 1,3,5-tri(p-acetylphenyl)benzene are dissolved in a flask in 40 ml of absolute benzene and then 5 ml of triethyl orthoformate are added thereto. A stream of dry HCl is passed therethrough under intense stirring. Some minutes afterwards the polymer precipitates. The polymer is treated as described in Example 1. The polymer is an insoluble yellow powder which, according to the thermomechanical data, does not soften till 700° C. The polymer losses 36% of its initial weight when heated in an inert atmosphere up to 900° C.

EXAMPLE 12

3 g of 4,4'-diacetyldiphenylmethane and 8 ml of triethyl orthoformate are dissolved in 45 ml of absolute benzene and a stream of dry HCl is passed therethrough under intense stirring. The polymer precipitates 5 minutes afterwards. The polymer is isolated and treated as described in Example 1. The polymer is an infusible and insoluble light-brown powder. According to the thermomechanical data, the flow temperature of the polymer is 700° C. When heated in an inert atmosphere to 900° C, the loss in the polymer weight is 35%.

EXAMPLE 13

2.5 g of 4,4'-diacetyldiphenyloxide and 2.1 g of 4-acetyldiphenyloxide are dissolved in 50 ml of absolute benzene in a flask equipped with a stirrer, the dissolution being effected under stirring, and 3.4 ml of triethyl orthoformate are added thereto. The molar ratio of diacetyl to monoacetyl is 1:1. A stream of dry HCl is passed during 1 hour at room temperature. The polymer is isolated as described in Example 2. Its yield is 2.7 g The product is soluble in chloroform and benzene and is not soluble in acetone. The average molecular weight of the product is 3100. Found, %; C = 82.97; H = 4.77. The flow temperature, according to the thermomechanical data, is 135° C.

EXAMPLE 14

2.54 g of 4,4'-diacetyldiphenyloxide, 1.62 g of p-diacetylbenzene and 1.87 ml of acetophenone (said components being in a molar ratio of 0.5:0.5:0.8) are dissolved in a flask in 45ml of absolute benzene; then 14 ml of triethyl orthoformate are added thereto, after which a stream of dry HCl is passed therethrough during 1 hour under intense stirring. The polymer is separated and treated as described in Example 2. The yield is 4.05 g. The polymer is a light-brown powder, soluble in benzene and chloroform. According to the thermomechanical data, the polymer starts softening at 200° C, though it does not exhibit flowability when heated up to 700° C.

EXAMPLE 15

2 g of p-diacetylbenzene are dissolved in a flask in 40 ml of absolute benzene and then 5 ml of triethyl orthoformate are added thereto. A stream of dry HCl is passed through the solution under intense stirring and at room temperature. 5 minutes after the commencement of the reaction, for blocking terminal acetyl groups, 4.34 ml of acetophenone and 7.4 ml triethyl orthoformate are added, and HCl is passed for another 2 hours. The resulting polyphenylene is precipitated with alcohol, washed with water and alcohol and extracted in a Soxhlet apparatus. Then the polyphenylene is heated under a vacuum (1–1.5 mm Hg) at 200° C. The product is a homogeneous brown mass. The average molecular weight of the polyphenylene is 1440. The polymer is soluble in benzene, in chlorinated hydrocarbons, in carbon disulphide, dimethylsulphoxide and in some other solvents. According to the thermogravimetric analysis data, an intensive decomposition of the polymer in air commences at a temperature of 500° C.

EXAMPLE 16

3 g of 4,4'-diacetyldiphenyl are suspended in 45 ml of absolute benzene and then 3.54 ml of acetophenone and 13 ml of triethyl orthoformate are added thereto. The molar ratio of diacetyl to monoacetyl is 1:2.4. A stream of dry HCl is passed through the solution during 15 minutes at room temperature, with the formation of a brown-coloured solution. The product is treated as described in Example 2. A brown powder is then produced which in the cold is soluble in chloroform, sparingly soluble in benzene and soluble, when heated, in dimethylsulphoxide. Found, %: C = 92.65; H = 5.19. The yield of the polymer is 3.07 g.

What is claimed is:

1. A method for producing phenylene-type polymers comprising polycondensing a compound selected from the group consisting of diacetylbenzenes; diacetylnaphthalenes; diacetyl compounds represented by the formula

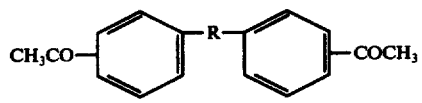

where R is a simple bond, $(CH_2)_m$ with $m = 1-20$, O, or S; triacetylbenzene; or 1,3,5-tri(acetylphenyl) benzenes, in the presence of inorganic acid catalysts at a temperature within a range from −40° to 300° C.

2. A method as claimed in claim 1, wherein said polycondensation is carried out in an organic solvent selected from the group consisting of aromatic hydrocarbons, chlorinated hydrocarbons, alcohols, glycols, ethers and phenols.

3. The method of claim 1 wherein the polycondensation is carried out in a solvent selected from the group consisting of aromatic hydrocarbons and chlorinated hydrocarbons.

4. A method as claimed in claim 2, wherein said method is carried out in the presence of a ketalyzing agent selected from the group consisting of triethyl orthoformate, dimethylsulfite, and triethyl orthosilicate.

5. A method as claimed in claim 4, wherein the resulting polymers are transformed into infusible and insoluble products by condensing the terminal groups of said polymers in the presence of inorganic acid catalysts at a temperature within a range from 150° to 300° C.

6. A method as claimed in claim 4 wherein the resulting polymers are transformed into infusible and insoluble products by condensing the terminal groups of these polymers at a temperature within a range from 200° to 300° C.

7. A method as claimed in claim 4, wherein the resulting polymers are reacted under the same conditions with a monoarylketone represented by the formula

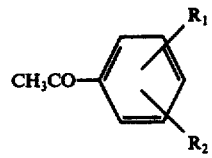

with $R_1$ being H, lower alkyl or phenyl and $R_2$ being H or phenyl.

8. A method as claimed in claim 1 wherein the resulting polymers are transformed into infusible and insoluble products by condensing the terminal groups of said polymers at a temperature within a range from 150° to 300° C.

9. A method for producing phenylene-type polymers comprising copolycyclocondensing compounds selected from the group consisting of diacetylbenzenes; diacetyl-naphthalenes; diacetyl compounds represented by the formula

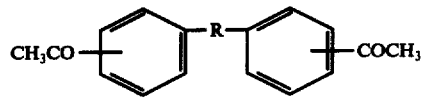

where R is a simple bond, $(CH_2)_m$ with $m = 1-20$, O, or S; triacetylbenzenes, or 1,3,5-tri (acetylphenyl)benzenes, with compounds selected from the group of methylarylketones represented by the formula

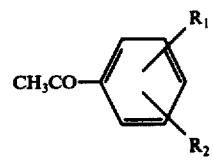

wherein $R_1$ is H, lower alkyl or phenyl; $R_2$ is H or phenyl; in the presence of inorganic acid catalysts at a temperature within a range from −40° to 300° C.

10. A method as claimed in claim 9 wherein said copolycondensation is carried out in a solvent of polyphosphoric acid at a temperature within a range from 100° to 120° C.

11. A method as claimed in claim 10 wherein the resulting polymers are transformed into infusible and insoluble products by condensing the terminal groups of these polymers in the presence of inorganic acid catalysts at a temperature within a range from 150° to 300° C.

12. A method as claimed in claim 9 wherein said method is carried out in an organic solvent selected from the group consisting of aromatic hydrocarbons, chlorinated hydrocarbons, alcohols, glycols, ethers and phenols.

13. The method of claim 9 wherein the method is carried out in a solvent selected from the group consisting of aromatic hydrocarbons and chlorinated hydrocarbons.

14. A method as claimed in claim 12, wherein said method is carried out in the presence of a ketalyzing agent selected from the group consisting of triethyl orthoformate, dimethylsulfite, and triethyl orthosilicate.

15. a method as claimed in claim 14, wherein the resulting polymers are transformed into infusible and insoluble products by condensing the terminal groups of these polymers in the presence of inorganic acid catalysts at a temperature within a range from 150° to 300° C.

16. A method as claimed in claim 14 wherein the resulting polymers are transformed into infusible and insoluble products by condensing the terminal groups of these polymers at a temperature within a range from 200° to 300° C.

17. A method as claimed in claim 14 wherein the resulting polymers are reacted under the same conditions by a monoarylketone represented by the formula

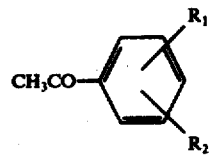

with $R_1$ being H, Cl, Br, phenyl or

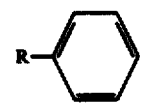

and $R_2$ being H or phenyl.

18. A method as claimed in claim 9 wherein the resulting polymers are transformed into infusible and insoluble products by condensing the terminal groups of these polymers at a temperature with a range from 150° to 300° C.

* * * * *